United States Patent
Huang et al.

(10) Patent No.: US 12,050,347 B2
(45) Date of Patent: Jul. 30, 2024

(54) VERTICAL POLARIZING BEAMSPLITTER FOR PHOTONICS

(71) Applicant: Taiwan Semiconductor Manufacturing Company, Hsinchu (TW)

(72) Inventors: Tai-Chun Huang, New Taipei (TW); Stefan Rusu, Sunnyvale, CA (US)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 169 days.

(21) Appl. No.: 17/751,777

(22) Filed: May 24, 2022

(65) Prior Publication Data
US 2023/0384519 A1    Nov. 30, 2023

(51) Int. Cl.
| G02B 6/27 | (2006.01) |
| G02B 6/12 | (2006.01) |
| G02B 6/122 | (2006.01) |
| G02B 6/124 | (2006.01) |
| G02B 6/126 | (2006.01) |
| G02B 6/13 | (2006.01) |
| G02B 27/28 | (2006.01) |

(52) U.S. Cl.
CPC ......... *G02B 6/2773* (2013.01); *G02B 6/1228* (2013.01); *G02B 6/124* (2013.01); *G02B 6/126* (2013.01); *G02B 6/13* (2013.01); *G02B 27/285* (2013.01); *G02B 2006/1215* (2013.01)

(58) Field of Classification Search
CPC .... G02B 6/0056; G02B 6/1228; G02B 6/126; G02B 6/13; G02B 6/2773; G02B 27/28–288
See application file for complete search history.

(56) References Cited

U.S. PATENT DOCUMENTS

| 10,641,956 | B1* | 5/2020 | Bian ........................ G02B 6/43 |
| 10,656,333 | B2 | 5/2020 | Mahgerefteh et al. |
| 10,859,769 | B2* | 12/2020 | Kojima ................ G02B 6/1225 |
| 2016/0327741 | A1* | 11/2016 | Wu ..................... H04B 10/2507 |
| 2019/0265415 | A1* | 8/2019 | Psaila ................ G02B 6/29331 |

FOREIGN PATENT DOCUMENTS

| CN | 111240055 A | * 6/2020 | |
| CN | 112269224 B | 4/2022 | |
| KR | 2018-0114559 A | * 10/2018 | ............ G02B 6/126 |
| TW | 198101 B | 1/1993 | |

OTHER PUBLICATIONS

Machine translation of KR-2018-0114559-A. (Year: 2018).*
Machine translation of CN-111240055-A. (Year: 2020).*

* cited by examiner

*Primary Examiner* — Michelle R Connelly
*Assistant Examiner* — Emma R. Oxford
(74) *Attorney, Agent, or Firm* — Lippes Mathias LLP

(57) ABSTRACT

A photonic polarizing beamsplitter is disclosed. The beamsplitter comprises a first waveguide, a second waveguide located above the first waveguide, and a birefringent coupler between the first waveguide and the second waveguide. The birefringent coupler has an effective refractive index for a TM mode which is greater than a refractive index of the first waveguide, and an effective refractive index for a TE mode which is less than the refractive index of the first waveguide. The second waveguide comprises a plurality of outwardly tapering legs with a gap between adjacent legs that are connected downstream to a body. The vertical beamsplitter uses less surface area.

20 Claims, 9 Drawing Sheets

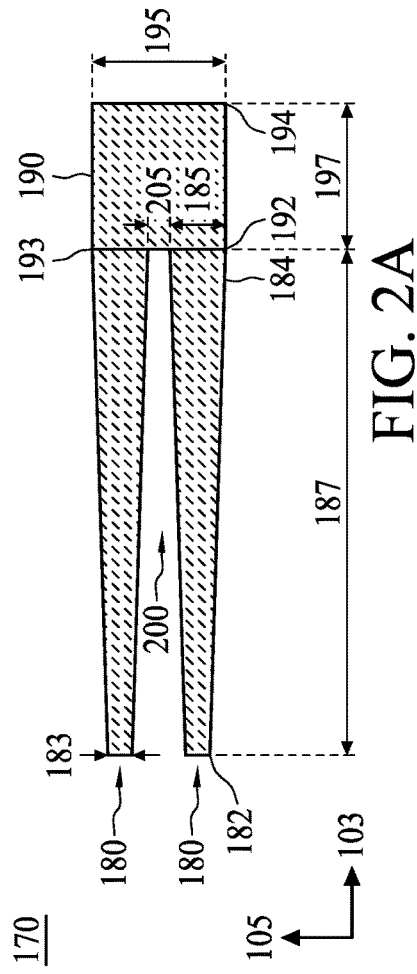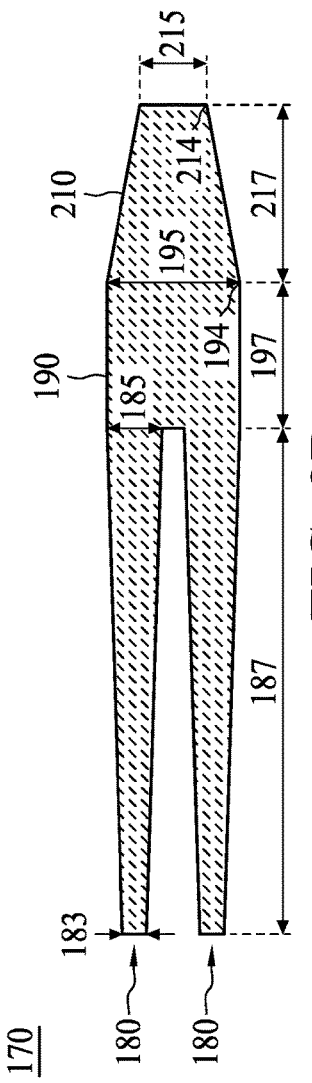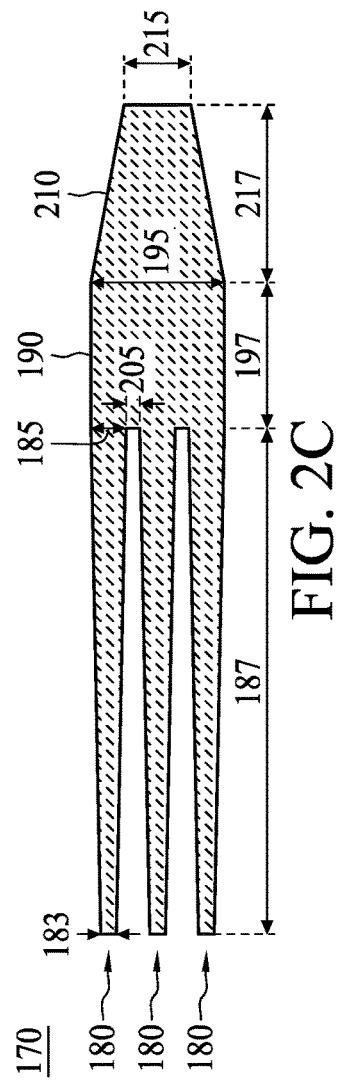

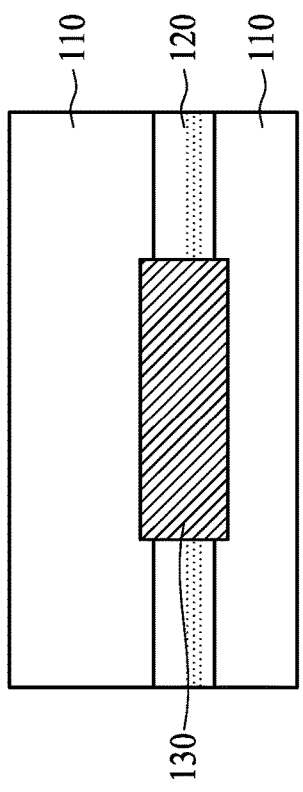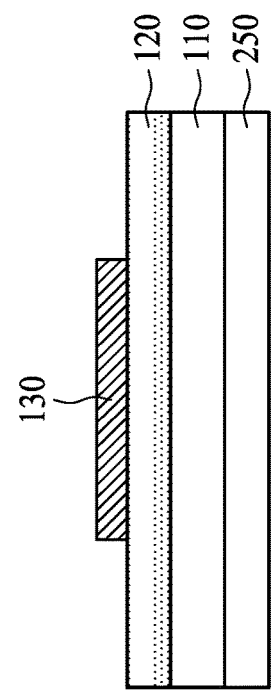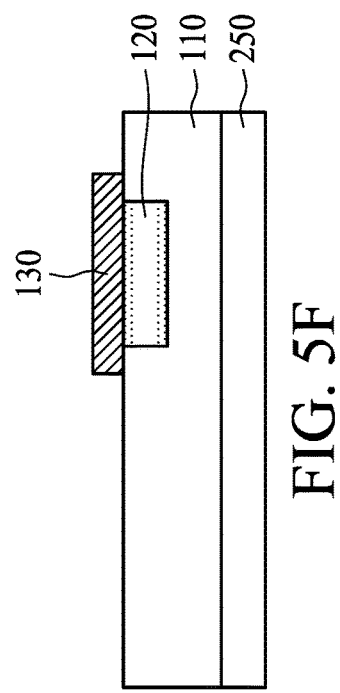

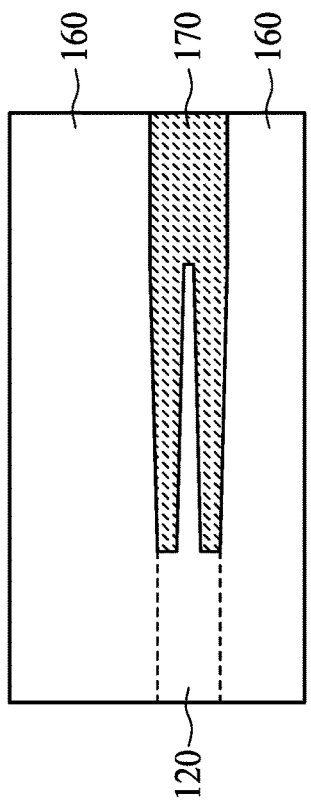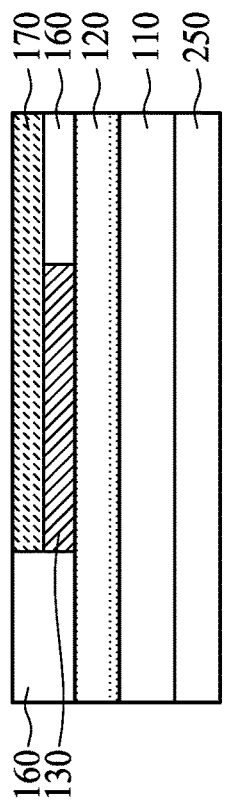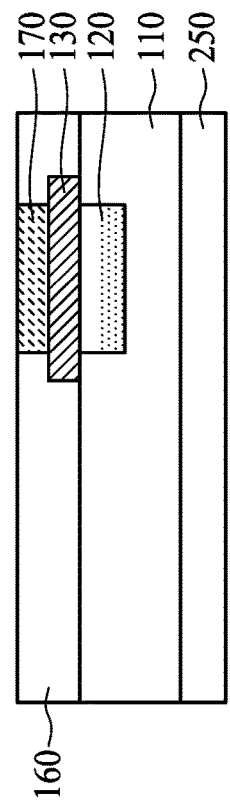

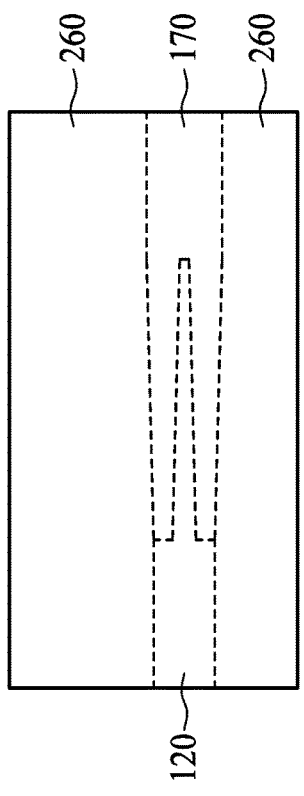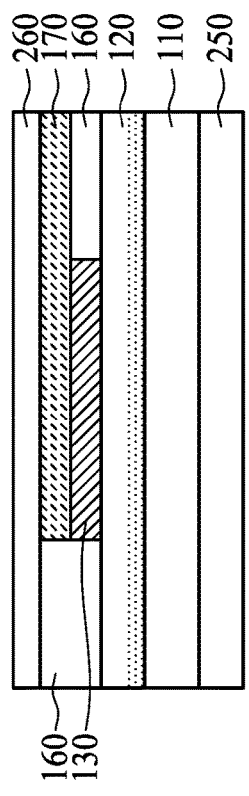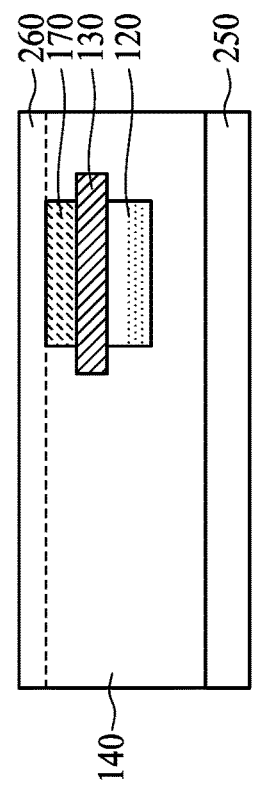

VERTICAL POLARIZING BEAMSPLITTER FOR PHOTONICS

BACKGROUND

Silicon photonics has quickly become a mainstream technology, particularly in photonic integrated circuits (PICs). Such circuits are based on a silicon-on-insulator (SOI) platform to achieve high speed optical communication.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 1A is a top view of the beamsplitter. FIG. 1B is a side cross-sectional view of the beamsplitter.

FIGS. 2A-2C are top views of different embodiments of the second waveguide 170. They vary in the number of legs, and in the absence/presence of a head.

FIGS. 5A-5L illustrate various cross-sectional views of intermediate stages for forming the photonic vertical polarizing beamsplitter as described in FIG. 4.

DETAILED DESCRIPTION

Figure 1A:
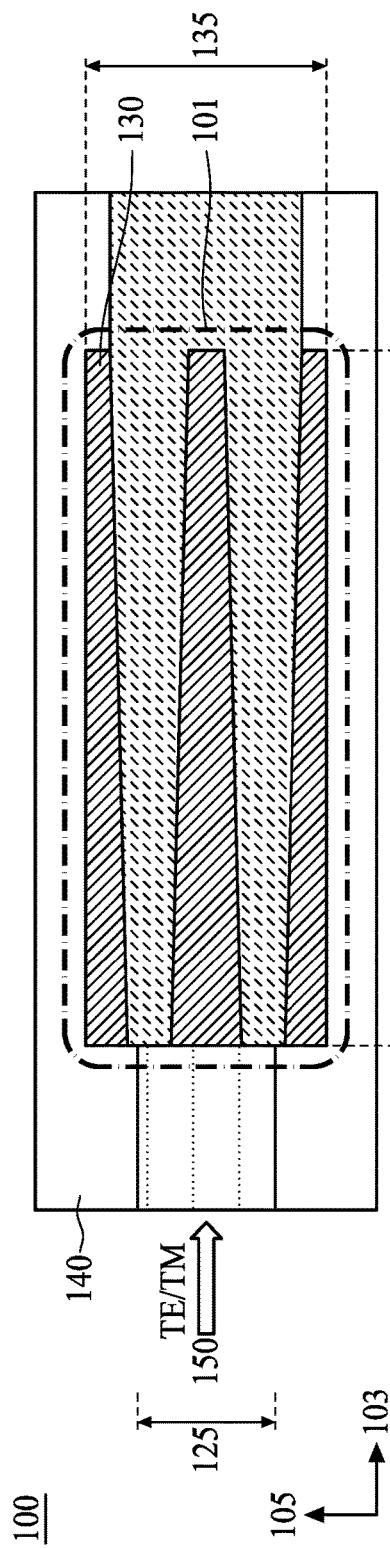
FIG. 1A and FIG. 1B are different views of a vertical polarizing beamsplitter, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Numerical values in the specification and claims of this application should be understood to include numerical values which are the same when reduced to the same number of significant figures and numerical values which differ from the stated value by less than the experimental error of conventional measurement technique of the type described in the present application to determine the value. All ranges disclosed herein are inclusive of the recited endpoint.

The term "about" can be used to include any numerical value that can vary without changing the basic function of that value. When used with a range, "about" also discloses the range defined by the absolute values of the two endpoints, e.g. "about 2 to about 4" also discloses the range "from 2 to 4." The term "about" may refer to plus or minus 10% of the indicated number.

The present disclosure relates to photonic devices which are made up of different layers. When the terms "on" or "upon" are used with reference to two different layers (including the substrate), they indicate merely that one layer is on or upon the other layer. These terms do not require the two layers to directly contact each other, and permit other layers to be between the two layers. For example all layers of the photonic device can be considered to be "on" the substrate, even though they do not all directly contact the substrate. The term "directly" may be used to indicate two layers directly contact each other without any layers in between them.

Similarly, the terms "input" and "output" are relative to light passing through them with respect to a given structure, e.g. light enters the structure through the input, and exits the structure through the output. The terms "upstream" and "downstream" are also relative to the direction in which light passes through various components, i.e. the light passes through an upstream component prior to passing through the downstream component.

The present disclosure relates to vertical polarizing beamsplitters which can be used in a photonic integrated circuit like a filter. Beamsplitters are widely used in integrated optics for separating wavelengths, or for combining wavelengths. A polarizing beamsplitter separates an incident light beam containing wavelengths with orthogonal polarization states (TE and TM modes) into two separate polarized beams, a TE-mode polarized beam and a TM-mode polarized beam.

Two-dimensional waveguides require a larger surface area. However, three-dimensional designs with multiple layers can result in power/energy losses due to transition loss as light moves between layers due to surface roughness, crosstalk as light leaks during the movement between layers, and other factors. The vertical polarizing beamsplitters of the present disclosure reduce the surface area, i.e. minimize the footprint of the beamsplitter. Power/energy losses are also reduced.

Figure 1B:
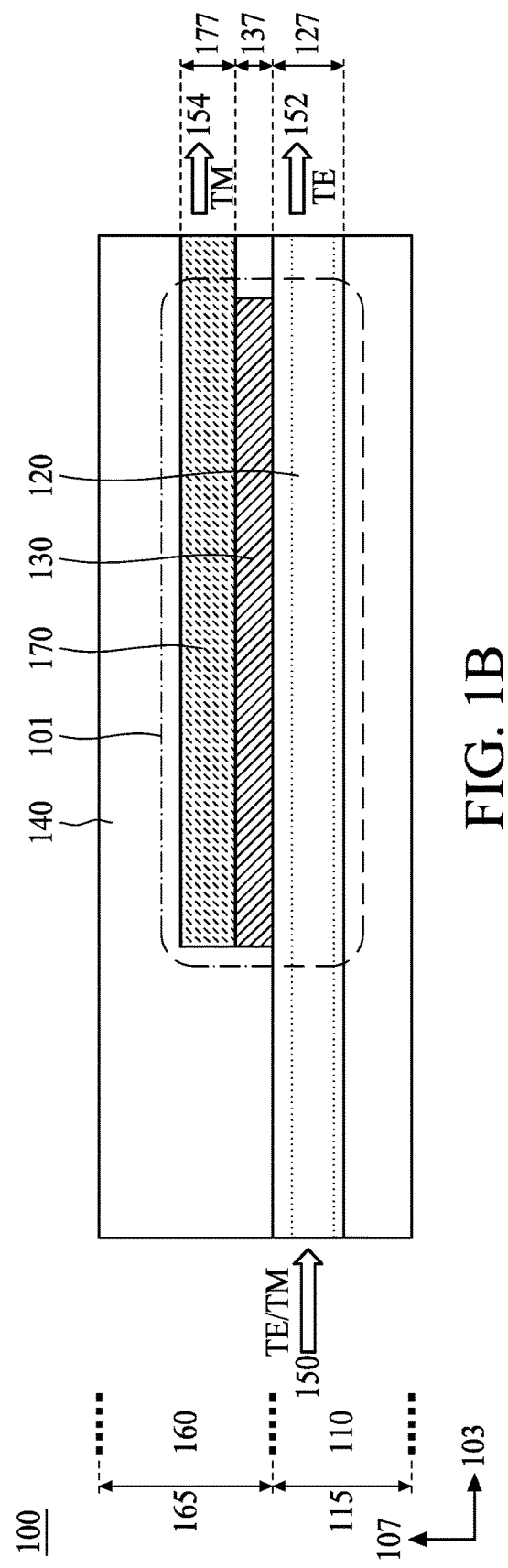

FIG. 1A and FIG. 1B are different views of one embodiment of the vertical polarizing beamsplitter of the present disclosure. FIG. 1A is a top view of the beamsplitter. FIG. 1B is a side cross-sectional view of the beamsplitter.

Referring first to FIG. 1A and FIG. 1B, the photonic vertical polarizing beamsplitter 100 includes a first waveguide 120 and a second waveguide 170 located above the first waveguide 120. The first waveguide 120 is located in a first optical routing layer 110, and the second waveguide 170 is located in a second optical routing layer 160.

A birefringent coupler 130 is present between the first waveguide 120 and the second waveguide 170, and is in direct contact with both waveguides. The birefringent coupler 130 is generally considered to be located in the second optical routing layer 160. The region in which the first waveguide 120, the birefringent coupler 130, and the second waveguide 170 overlap vertically is labeled here as a vertical overlap region 101.

A waveguide is commonly formed from a core surrounded by a cladding, with the refractive index of the core being greater than the refractive index of the cladding. The first waveguide 120, the birefringent coupler 130, and the second waveguide 170 are surrounded by cladding 140. The refractive index of the cladding 140 is lower than the refractive index of each of the first waveguide 120 and the second waveguide 170. Thus, the cladding encourages total internal reflection within the first waveguide and the second waveguide outside of the vertical overlap region 101.

In some particular embodiments, the first waveguide 120 and the second waveguide 170 are made of the same material. In more specific embodiments, the first waveguide and the second waveguide are made of silicon nitride ($Si_3N_4$) or silicon. The cladding 140 makes up the remainder of the first optical routing layer 110 and the second optical routing layer 160, and may be considered to be part of these two layers as well. In some particular embodiments, the cladding is made of silicon dioxide ($SiO_2$). For reference, silicon has a refractive index of about 3.6, silicon nitride has a refractive index of about 1.98, and silicon dioxide has a refractive index of about 1.45.

Also indicated is an optical input 150 into the first waveguide 120. As a non-limiting example, the optical input includes both TE-mode wavelengths and TM-mode wavelengths. The optical input passes through the vertical overlap region 101 of the polarizing beamsplitter and is separated based on the polarization of the wavelengths. The TE-mode wavelengths will remain in the first waveguide, and is referred to herein as a TE-mode output 152. The TM-mode wavelengths will pass through the birefringent coupler 130, and are transferred from the first waveguide 120 to the second waveguide 170. The output of the second waveguide is referred to here as the TM-mode output 154. It should be noted that there is no other input to the second waveguide 170 other than the wavelengths that pass through the birefringent coupler 130. The birefringent coupler may also be considered to act as a filter for TM-mode wavelengths.

In this regard, without being bound by theory, the birefringent coupler will have a different effective refractive index for the TE-mode wavelengths and the TM-mode wavelengths due to their different polarization. Thus, when the birefringent coupler has an effective refractive index for the TM-mode wavelengths which is greater than the refractive index of the first waveguide, then the birefringent coupler will no longer act as a cladding, and the TM-mode wavelengths can pass from the first waveguide through the birefringent coupler and into the second waveguide. At the same time, the birefringent coupler has an effective refractive index for the TE-mode wavelengths which is less than the refractive index of the first waveguide. As a result, the birefringent coupler continues to act as a cladding, and reflects TE-mode wavelengths so that they remain within the first waveguide.

The birefringent coupler is made from a birefringent material. Desirably, the refractive index of the birefringent material is close to that of silicon nitride (RI~1.98). Some examples of birefringent materials include hafnium oxide (RI~1.88), zirconium oxide (RI~2.11), aluminum oxide (RI~1.75), hafnium silicate (RI~2.22), zirconium silicate (RI~1.78-1.99), hafnium oxynitride (RI~2.0-2.3), zirconium oxynitride (RI~2.0-4.7), silicon oxynitride (RI~1.46-2.1), boron nitride (RI~2.08), and silicon carbide (RI~2.58). In some particular embodiments, the birefringent coupler is made from hafnium oxide or zirconium oxide. The material may be further modified using known methods to obtain the desired effective refractive indices for the TE-mode and TM-mode.

In particularly desirable embodiments, the birefringent material is also a high-k dielectric material (which has a dielectric constant greater than 3.9). In some embodiments of the present disclosure, the high-k dielectric material has a dielectric constant of at least 5, or at least 7, or at least 10. The high-k dielectric material may have a maximum dielectric constant of about 30.

As illustrated, the optical input 150 comes in from the left-hand side and travels to the right-hand side. The TE-mode wavelengths and the TM-mode wavelengths will also continue to travel in the same direction. Thus, the two waveguides can also be described as being co-directionally coupled. Either waveguide 120, 170 may include bends (not shown) to direct their output 152, 154 in any desired direction within the larger photonic integrated circuit.

Continuing, the length of the various components of the polarizing beamsplitter is determined by considering the first waveguide 120 to be straight and to define the axis in which the length is measured. The length axis is indicated with reference numeral 103. The axis 105 in which the width is measured is normal to the length axis 103, and in the horizontal direction within a given layer. The axis 107 in which the height or thickness is measured is normal to both the length axis 103 and the width axis 105, and is in the vertical direction and will pass through multiple layers.

The vertical overlap region 101 has a length 102. The first waveguide 120 has a length 123, a width 125, and a thickness 127. Similarly, the birefringent coupler 130 has a length 133, a width 135, and a thickness 137. The second waveguide 170 also has a thickness 177.

The length 123 of the first waveguide may be from about 1 micrometer to about 50 micrometers. It is noted that this length refers to the portion of the first waveguide that is located within the vertical overlap region 101, and is not the length of the entire waveguide. The width 125 of the first waveguide may be from about 0.1 micrometers to about 20 micrometers. The thickness 127 of the first waveguide may range from about 20 nanometers to about 1200 nanometers, or from about 40 nanometers to about 1100 nanometers. For ease of manufacturing, the first waveguide 120 generally has a rectangular shape, although this is not required.

The length 133 of the birefringent coupler is selected to cover the first waveguide within the vertical overlap region. Similarly, the width 135 of the birefringent coupler is selected to cover the first waveguide within the vertical overlap region, and may be wider than that of the first waveguide. The thickness 137 of the birefringent coupler may range from about 1 nanometer to about 1200 nanometers, or from about 1 nanometer to about 1000 nanometers.

The thickness 177 of the second waveguide may also range from about 20 nanometers to about 1200 nanometers, or from about 40 nanometers to about 1100 nanometers.

Referring now to FIG. 1B, the first optical routing layer 110 has a thickness 115 and the second optical routing layer 160 has a thickness 165. These layers have a thickness sufficient to separate the first waveguide 120 and the second waveguide 170 and to cause reflection as needed for operation of the photonic device.

Continuing, FIGS. 2A-2C are top views of different embodiments of the second waveguide 170. Referring first to FIG. 2A, the second waveguide is a single structure. In this embodiment of the second waveguide 170, the structure can be described as having a plurality of outwardly tapering legs 180 which are connected downstream to a body 190. A gap 200 is present between adjacent legs.

Each leg 180 has a distal end 182 and a proximal end 184. The proximal end 184 of the leg is proximal the body 190. The distal end may also be referred to as an upstream end, and the proximal end may also be referred to as a downstream end. The leg has a distal width 183, measured at the distal end of the leg. The leg also has a proximal width 185, measured at the proximal end of the leg. The gap 200 between legs has a gap width 205.

Similarly, the body 190 has an upstream end 192 and a downstream end 194. The proximal ends 184 of the legs 180 are joined to the upstream end 192. The body has an upstream end width 193 and a downstream end width 195.

Now referring to both FIG. 1A and FIG. 2A, the distal end 182 of each leg is closer to the optical input 150. Thus, the leg tapers outwardly from the direction of the optical input. In particular embodiments, the distal width 183 of each leg 180 is from about 5% to about 95% of the width 125 of the first waveguide 120. In particular embodiments, the proximal width 185 of each leg 180 is also from about 5% to about 95% of the width 125 of the first waveguide 120. However, the distal width 183 of the leg is always less than or equal to the proximal width 185 of the leg. In particular embodiments, the gap width 205 between adjacent legs 180 is also from about 5% to about 95% of the width 125 of the first waveguide 120.

The upstream end width 193 of the body can be considered to be the sum of all proximal leg width(s) 185 and all gap width(s) 205. In particular embodiments, the upstream end width 193 of the body is from about 30% to about 300% of the width 125 of the first waveguide 120. In some more specific embodiments, the upstream end width 193 is from about 100% to about 300% of the first waveguide width 125.

In particular embodiments, the downstream end width 195 of the body is from about 30% to about 300% of the width 125 of the first waveguide 120, including from about 100% to about 300%. However, the downstream end width 195 of the body is always greater than or equal to the upstream end width 193.

Each leg has a length 187 which is measured along the length axis 103. The body also has a length 197. In particular embodiments, the leg length 187 is from about 1 micrometer to about 50 micrometers. In particular embodiments, the body length 197 is from about 1 micrometer to about 50 micrometers. Generally, the leg length 187 is greater than the body length 197. In some more specific embodiments, the leg length 187 is from about two to about four times the body length 197.

As illustrated in FIG. 1A, only the legs 180 are present in the vertical overlap region 101 of the polarizing beamsplitter. However, in some embodiments the body 190 is also present in the vertical overlap region, or in other words is also located over the first waveguide. Also as illustrated here, the legs are sized such that their distal ends 182 extend beyond the width of the first waveguide 120. However, in some embodiments, the distal ends 182 are located wholly upon the first waveguide. In addition, as illustrated in FIG. 1A, the lateral sides of the legs are of the same length. However, this is not required, and the lateral sides could be different lengths. For example, the legs may be described as having a quadrilateral shape, and could include a right angle at the distal end and a right angle at the proximal end. Furthermore, the taper of the legs from the distal end to the proximal end does not need to be linear, and could take the form of a curve if desired. Continuing, the second waveguide is illustrated in FIG. 1A and FIG. 2A with two outwardly tapering legs. In particular embodiments, the two legs have the same distal end width and the same proximal end width. However, this is not required.

Referring now to FIG. 2B, in this embodiment, beside the two legs 180 and the body 190, the second waveguide also includes a head 210 which is connected to the downstream end 194 of the body. The head is optional, and when present may be used to change the width of the second waveguide. The head tapers inwards relative to the optical input direction. The head has an upstream end with a width, which may be considered to be the same as the downstream end width 195 of the body. The head 210 also has a downstream end 214 with a width 215 that is from about 30% to about 300% of the first waveguide width 125, and is also less than the downstream end width 195 of the body. The length 217 of the head is from about 1 micrometer to about 50 micrometers. In particular embodiments, the head length 217 is from about 50% to about 150% of the body length 197.

Referring now to FIG. 2C, in this embodiment, the second waveguide includes three legs 180 in addition to the body 190 and the head 210. Again, as previously discussed, the distal widths 183 and the proximal widths 185 of the three legs can vary independently from each other. In addition, the two gap widths 205 between the three legs can be the same, or may be different from each other.

Figure 3A:
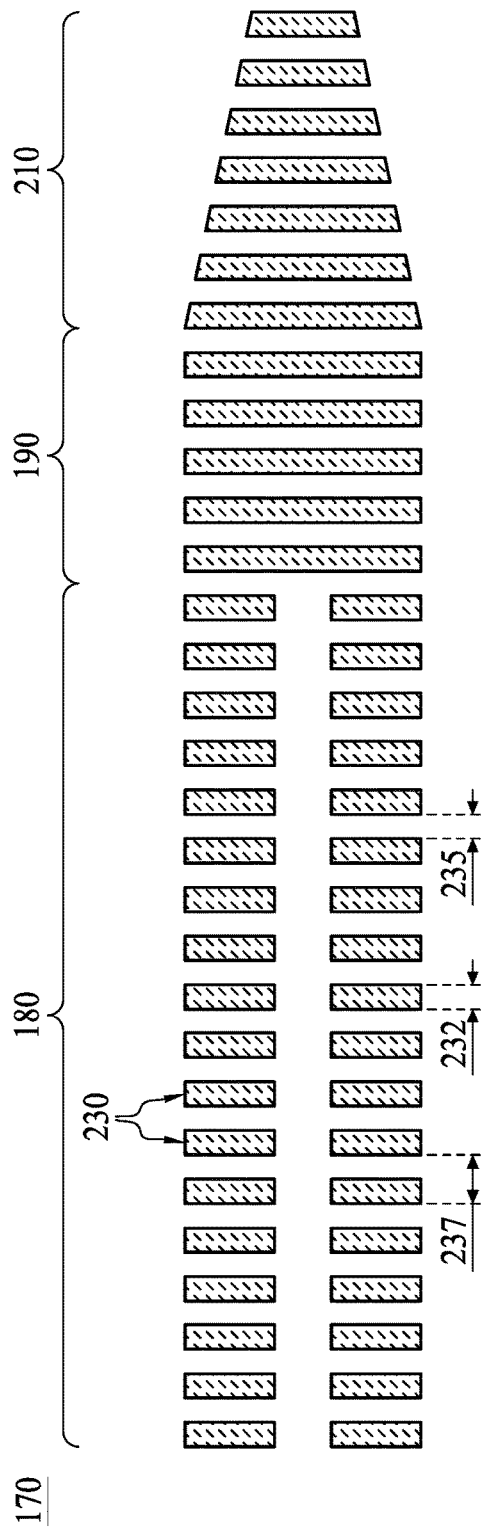
FIG. 3A and FIG. 3B are top views of other embodiments of the second waveguide, which are in the form of a Bragg grating.
Figure 3B:
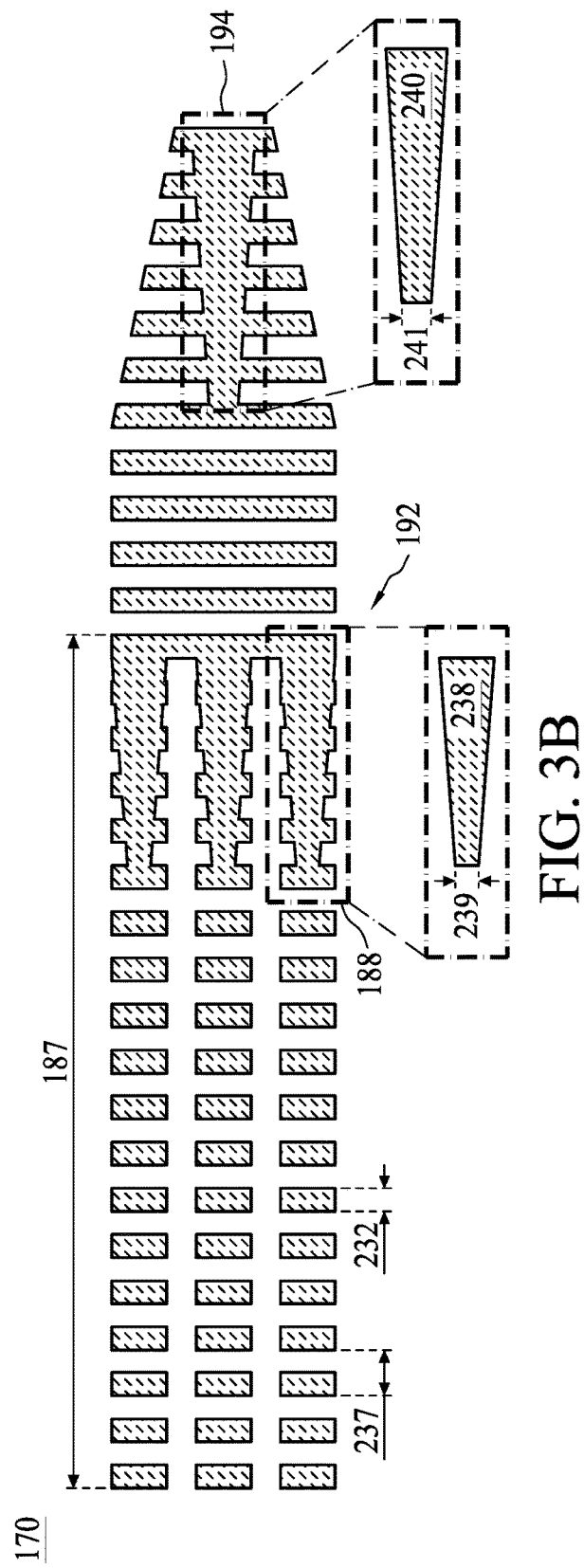

FIG. 3A and FIG. 3B are two additional embodiments of the second waveguide 170. In these embodiments, the second waveguide is in the form of a Bragg grating.

Referring now to FIG. 3A, the Bragg grating is formed from a plurality of ridges 230. The length between the front surface of adjacent ridges is the grating period 237. In specific embodiments, the grating period of the Bragg grating is from about 50 nanometers to about 500 nanometers, including from about 100 nanometers to about 500 nanometers. This grating period is suitable for processing of light wavelengths in the O-band (1260 nm to 1360 nm) and the C-band (1530 nm to 1565 nm), which are commonly used for data communication and telecommunication, respectively. In some embodiments, the number of ridges in the Bragg grating is from about 30 to about 200.

The length of each ridge in the Bragg grating is indicated with reference numeral 232. In particular embodiments, the length of each ridge in the Bragg grating is from about 1% to about 99% of the period for the Bragg grating. The distance between the rear surface and the front surface of adjacent ridges is the spacing between ridges, and is indicated with reference numeral 235. In particular embodiments, the spacing is also from about 1% to about 99% of the period. Together, the sum of the length 232 and the spacing 235 equals the grating period 237.

The width of each ridge will vary depending on whether the ridge is in the leg 180, the body 190, or the head 210 as previously described. In FIG. 3A, the distal width and the proximal width of the legs are illustrated as being equal to each other. The thickness/height of each ridge in the Bragg grating is as previously described. The bottom of each ridge will contact the birefringent coupler.

In the embodiment of FIG. 3B, three legs are present. In addition, a proximal end region 188 of the leg is shown as including a quadrilateral feature 238. In some embodiments, the proximal end region 188 may extend from about 10% to about 50% of the leg length 187. The quadrilateral feature has its base on the upstream end 192 of the body. The width 239 of the quadrilateral feature at the upstream end of the proximal end region may be from about 10 nanometers to about 300 nanometers. The quadrilateral feature tapers outwards from the direction of the optical input.

As illustrated in the embodiment of FIG. 3B, the head 210 may also include a quadrilateral feature 240. This quadrilateral feature extends through the entire length 217 of the head. The width 241 of the quadrilateral feature at the upstream end 194 of the head may also be from about 10 nanometers to about 300 nanometers. The quadrilateral feature tapers outwards from the direction of the optical input.

Figure 4:
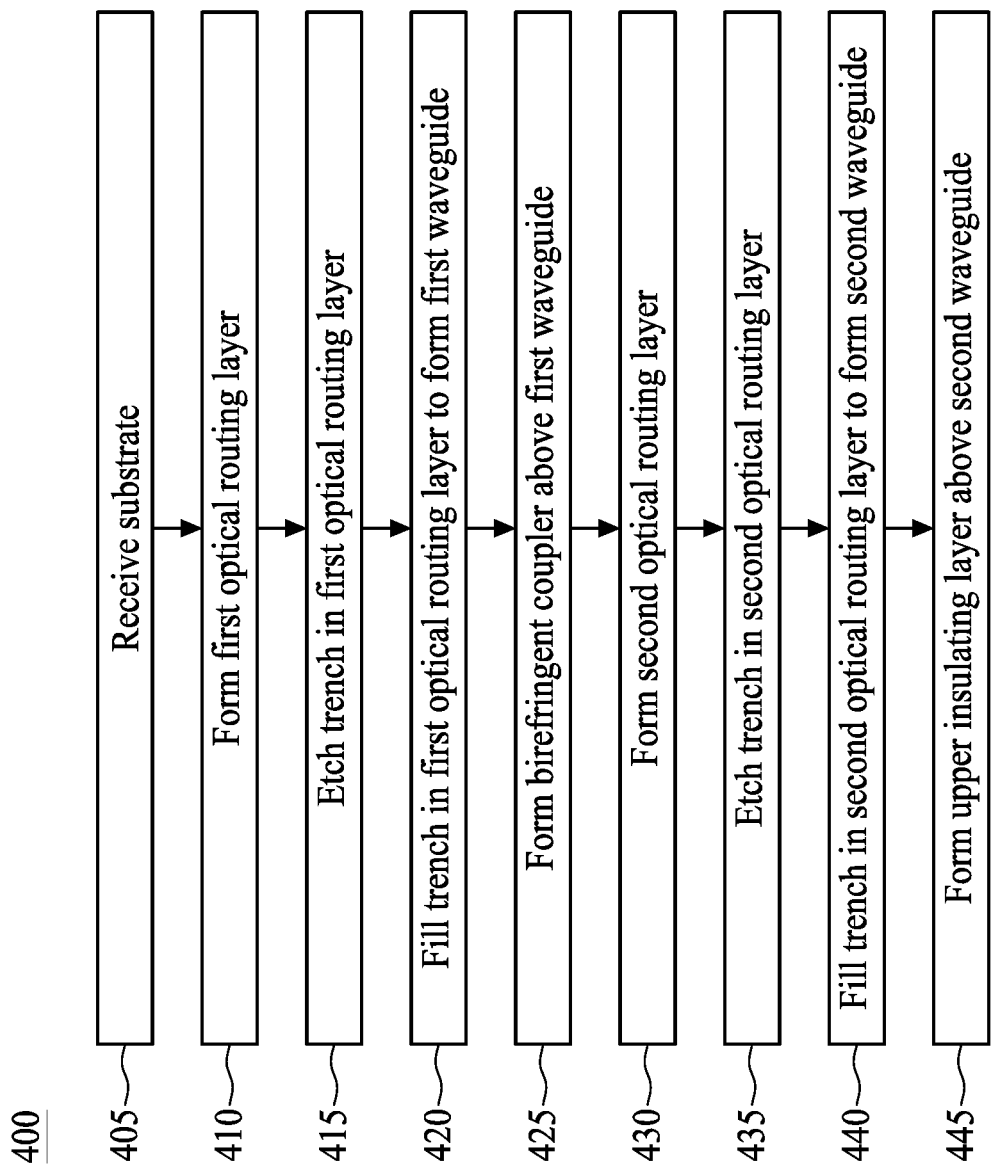
FIG. 4 is a flow chart illustrating a first method for making the photonic vertical polarizing beamsplitter, in accordance with some embodiments.

FIG. 4 is a flow chart illustrating an example of one method 400 for making the vertical polarizing beamsplitter or filter of FIG. 1A and FIG. 1B, in accordance with some embodiments. FIGS. 5A-5J illustrate various steps of the method, and these figures are discussed together.

Referring now to FIG. 4, in step 405, a substrate is received or provided. The substrate is usually a wafer made of a semiconducting material. Such materials can include silicon, for example in the form of crystalline Si or polycrystalline Si. The substrate can also be made from other elementary semiconductors such as germanium or $Al_2O_3$ (sapphire), or may include a compound semiconductor such as silicon carbide (SiC), gallium nitride (GaN), gallium arsenide (GaAs), indium arsenide (InAs), and indium phosphide (InP), or from other materials such as glass, a ceramic, or a dielectric material.

Next, in step 410, a first optical routing layer is formed. The first optical routing layer is electrically insulating. This layer may be formed using processes such as thermal oxidation, atomic layer deposition (ALD) or chemical vapor deposition (CVD), including plasma-enhanced atomic layer deposition (PEALD) or plasma-enhanced chemical vapor deposition (PECVD). In particular embodiments, the first optical routing layer is formed from silicon dioxide ($SiO_2$).

Continuing, next, a photoresist layer is deposited and patterned. The photoresist may be applied, for example, by spin coating, or by spraying, roller coating, dip coating, or extrusion coating. Typically, in spin coating, the substrate is placed on a rotating platen, which may include a vacuum chuck that holds the substrate in plate. The photoresist is then applied to the center of the substrate. The speed of the rotating platen is then increased to spread the photoresist evenly from the center of the substrate to the perimeter of the substrate. The rotating speed of the platen is then fixed, which can control the thickness of the final photoresist layer. The photoresist can be baked or cured to remove the solvent and harden the photoresist layer. The photoresist is then exposed to patterned light, and then developed to obtain a patterned photoresist layer. In particular embodiments, extreme ultraviolet (EUV) light having a wavelength of about 13.5 nm is used for patterning, as this permits smaller feature sizes to be obtained.

In step 415, the first optical routing layer is then etched to form a trench within the first optical routing layer. Generally, any etching step used herein may be performed using wet etching, dry etching, or plasma etching processes such as reactive ion etching (RIE) or inductively coupled plasma (ICP), as appropriate. The etching may be anisotropic. Depending on the material, etchants may include carbon tetrafluoride ($CF_4$), hexafluoroethane ($C_2F_6$), octafluoropropane ($C_3F_8$), fluoroform ($CHF_3$), difluoromethane ($CH_2F_2$), fluoromethane ($CH_3F$), trifluoromethane ($CHF_3$), carbon fluorides, nitrogen ($N_2$), hydrogen ($H_2$), oxygen ($O_2$), argon (Ar), xenon (Xe), xenon difluoride ($XeF_2$), helium (He), carbon monoxide (CO), carbon dioxide ($CO_2$), fluorine ($F_2$), chlorine ($C_{12}$), oxygen ($O_2$), hydrogen bromide (HBr), nitric acid ($HNO_3$), hydrofluoric acid (HF), ammonium fluoride ($NH_4F$), nitrogen trifluoride ($NF_3$), sulfur hexafluoride ($SF_6$), boron trichloride ($BC_{13}$), ammonia ($NH_3$), bromine ($Br_2$), nitrogen trifluoride ($NF_3$), or the like, or combinations thereof in various ratios.

In step 420, the first waveguide is then formed in the trench in the first optical routing layer. In particular embodiments, the first waveguide comprises silicon nitride ($Si_3N_4$). Silicon nitride can be deposited using PECVD or low pressure chemical vapor deposition (LPCVD) by the reaction of dichlorosilane ($SiH_2Cl_2$) with ammonia ($NH_3$). The patterned photoresist layer is then removed.

Figure 5A:
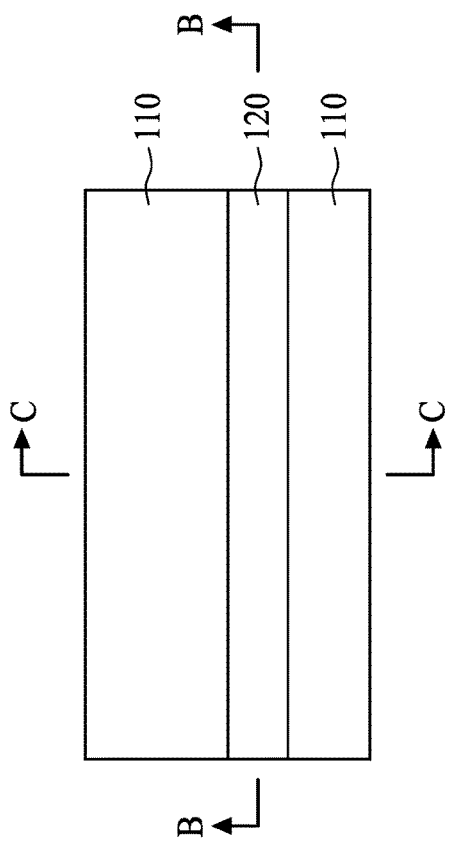
Figure 5B:
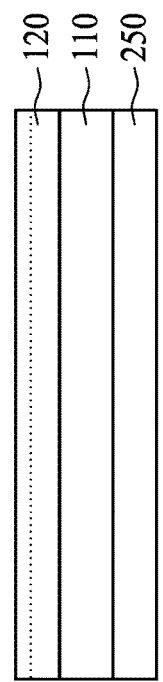
Figure 5C:
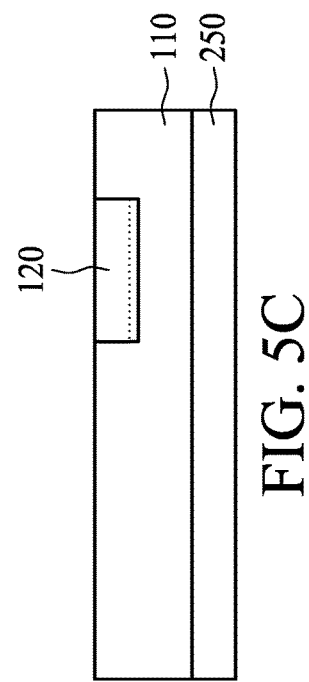

FIG. 5A is a plan view illustrating the resulting structure after this step. FIG. 5B is a length-wise cross-sectional view along line B-B of FIG. 5A. FIG. 5C is a width-wise cross-sectional view along line C-C of FIG. 5A. All subsequent cross-sectional views in FIGS. 5D-5L will also be along these lines as indicated. Continuing, the first optical routing layer 110 is present upon the substrate 250, with the first waveguide 120 located in the first optical routing layer 110. It is noted the top of the first waveguide 120 is exposed.

Another photoresist layer is deposited and patterned upon the first optical routing layer. Next, in step 425, the birefringent coupler is formed above the first optical routing layer and more specifically the first waveguide. This may be done using CVD, for example, or other suitable processes. The patterned photoresist layer is then removed.

FIG. 5D is a plan view, FIG. 5E is a length-wise cross-sectional view, and FIG. 5F is a width-wise cross-sectional view illustrating the resulting structure after this step. For illustrative purposes, the birefringent coupler 130 is shown with a greater width than the first waveguide 120.

Next, in step 430, a second optical routing layer is formed. The second optical routing layer is also electrically insulating, and can be formed as previously described. In particular embodiments, the second optical routing layer is formed from silicon dioxide ($SiO_2$). The second optical routing layer is deposited to completely cover the birefringent coupler. CMP (chemical mechanical polishing) may be performed if necessary.

Continuing, next, a photoresist layer is deposited and patterned. In step 435, the second optical routing layer is then etched to form a trench within the second optical routing layer. The etching is performed to a depth so that the birefringent coupler 130 is exposed. In step 440, the second waveguide is then formed in the trench in the second optical routing layer. This can be done by CVD, ALD, or other suitable processes. In particular embodiments, the second waveguide comprises silicon nitride ($Si_3N_4$). The patterned photoresist layer is then removed. CMP may be performed again if desired.

FIG. 5G is a plan view, FIG. 5H is a length-wise cross-sectional view, and FIG. 5I is a width-wise cross-sectional view illustrating the resulting structure after this step. The birefringent coupler 130 and the second waveguide 170 are located in the second optical routing layer 160. In FIG. 5G, the first waveguide 120 is illustrated in dashed lines to indicate it is covered by the second optical routing layer. It is noted that the first waveguide 120, the birefringent coupler 130, and the second waveguide 170 all overlap in a vertical overlap region 101, as indicated in FIG. 5H and FIG. 5I.

Finally, in step 445, an upper insulating layer or cladding layer is deposited upon the second optical routing layer. In particular embodiments, this upper insulating layer is formed from silicon dioxide ($SiO_2$).

FIG. 5J is a plan view, FIG. 5K is a length-wise cross-sectional view, and FIG. 5L is a width-wise cross-sectional view illustrating the resulting structure after this step. In FIG. 5L, the upper insulating layer 260 is marked in dashed lines, and the lines denoting the other layers are removed to indicate the cladding 140. The second waveguide 170 is also marked with a dashed line to indicate it is below the upper insulating layer 260. The TE-mode output 152 from the first waveguide 120 and the TM-mode output 154 from the second waveguide 170 can be used as inputs to another photonic device or further processed, for example by being converted into an electrical signal.

The second waveguides illustrated in FIG. 3A and FIG. 3B, in the form of a Bragg grating, may be formed in substantially the same manner. The main difference is that in step 435, the ridges of the Bragg grating are patterned and then filled.

Figure 6:
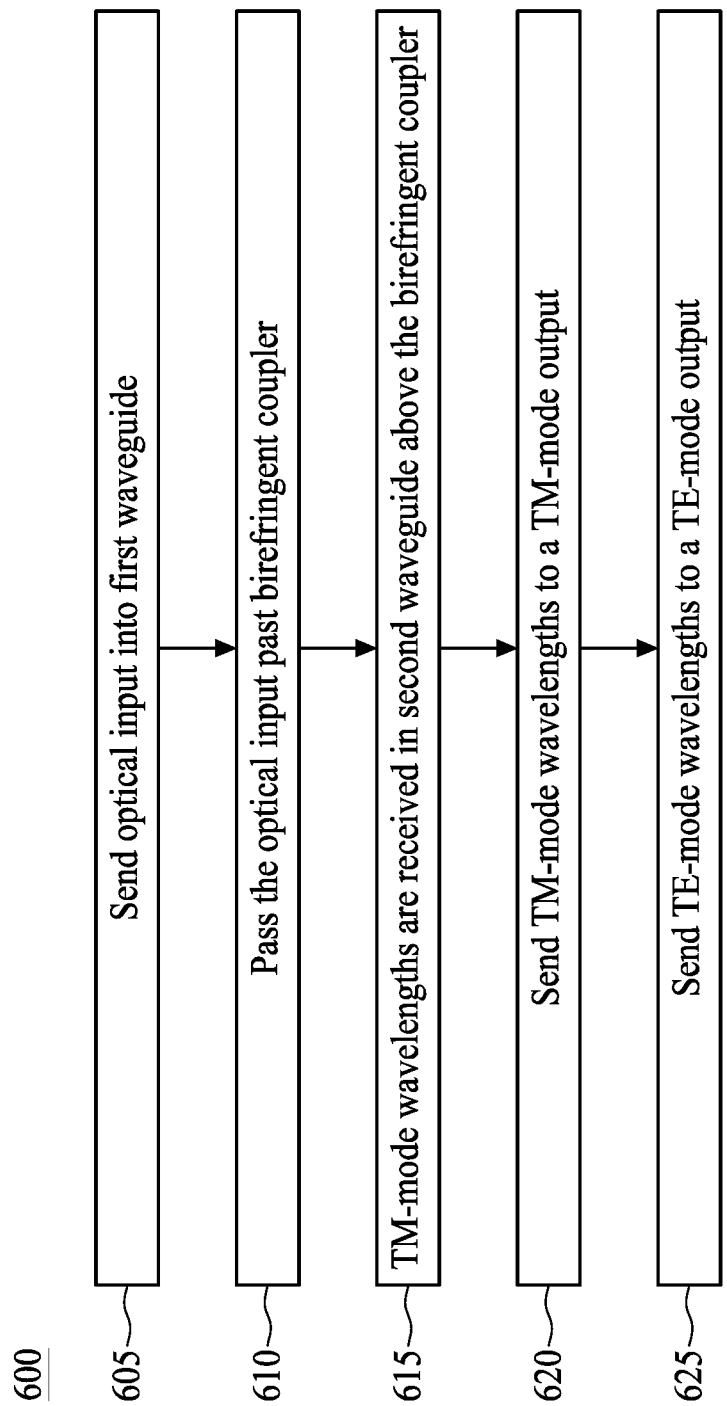
FIG. 6 is a flow chart illustrating a method for using the photonic vertical polarizing beamsplitter, in accordance with some embodiments.

FIG. 6 is a flow chart illustrating a method 600 for using the vertical photonic grating filter, in accordance with some embodiments. In step 605, an optical input is sent into a first waveguide. The optical input comprises TE-mode wavelengths and TM-mode wavelengths. In step 610, the optical input passes the birefringent coupler, which acts as a filter for the TM-mode wavelengths. In step 615, the TM-mode wavelength(s) are received in the second waveguide located above the birefringent coupler. The second waveguide has the structure described above. In step 620, the TM-mode wavelength(s) are sent through the second waveguide to a TM-mode optical output. In step 625, the TE-mode wavelength(s) remaining in the first waveguide are sent to a TE-mode optical output. The separated wavelengths having different polarization may then be further processed in the photonic device.

The photonic vertical polarizing beamsplitters/filters of the present disclosure have several benefits. First, they greatly reduce the surface area and the length needed for the splitting/filtering function, thus increasing component density for the overall SOI platform. The use of the birefringent coupler reduces the split polarization length of the beamsplitter and increases the coupling efficiency. Broadband polarization and polarization independence are permitted using this design. The influence of the thickness of the layer between the two waveguides on wavelength selection is also eliminated. Other performance characteristics such as the bandwidth and/or the extinction ratio can also be improved. The characteristics can be adjusted freely between layers, or can be used independently, or can be integrated between multiple layers. The process uses CMOS-compatible manufacturing processes, and is easily scalable. The grating filters can also be easily integrated with other photonic components to obtain a large-scale photonic integrated circuit (PIC).

The photonic vertical polarizing beamsplitters/filters of the present disclosure can be used in many different types of photonic circuits. For example, they can be used in polarization control equipment, polarization-independent directional couplers, and polarization rotators. Controlling the polarization is also useful in imaging applications for eliminating glare, increasing contrast, and/or reducing hot spots.

Some embodiments of the present disclosure thus relate to photonic polarizing beamsplitters, which comprise a first waveguide, a second waveguide, and a birefringent coupler. The second waveguide is located above the first waveguide. The birefringent coupler is located between the first waveguide and the second waveguide. The second waveguide comprises a plurality of outwardly tapering legs with a gap between adjacent legs that are connected downstream to a body.

Also disclosed in various embodiments herein are methods for making a photonic polarizing beamsplitter. A first waveguide is formed in a first optical routing layer on a substrate. A birefringent coupler is formed above the first waveguide from a birefringent material. A second waveguide is then formed in a second optical routing layer on the substrate above the first waveguide. The second waveguide comprises a plurality of outwardly tapering legs with a gap between adjacent legs that are connected downstream to a body.

Also disclosed herein are methods for separating TE-mode wavelengths from TM-mode wavelengths in a photonic device. An optical input is sent into a first waveguide. The optical input comprises at least one TE-mode wavelength(s) and at least one TM-mode wavelength(s). The optical input passes through a vertical overlap region that includes a birefringent coupler and a second waveguide above the first waveguide. The second waveguide may comprise a plurality of outwardly tapering legs with a gap between adjacent legs that are connected downstream to a body. The TM-mode wavelengths are received in the second waveguide. The TE-mode wavelengths remain in the first waveguide.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for making a photonic polarizing beamsplitter, comprising:
   forming a first waveguide in a first optical routing layer on a substrate;
   forming a birefringent coupler above the first waveguide from a birefringent material; and
   forming a second waveguide in a second optical routing layer on the substrate above the first waveguide;
   wherein the second waveguide comprises a plurality of outwardly tapering legs with a gap between adjacent legs that are connected downstream to a body, as determined when light is sent into the first waveguide.

2. The method of claim 1, wherein the plurality of outwardly tapering legs has two legs or three legs.

3. The method of claim 1, wherein a distal end of each leg has a width of 5% to 95% of a width of the first waveguide.

4. The method of claim 1, wherein a proximal end of each leg has a width of 5% to 95% of a width of the first waveguide.

5. The method of claim 1, wherein each gap has a width of 5% to 95% of a width of the first waveguide.

6. The method of claim 1, wherein a downstream end of the body has width of 30 to 300% of a width of the first waveguide.

7. The method of claim 1, wherein the first waveguide has a width of about 0.1 micrometers to about 20 micrometers, or wherein the first waveguide has a length of about 1 micrometer to about 50 micrometers.

8. The method of claim 1, wherein the second waveguide further comprises an inwardly tapering head downstream of the body.

9. The method of claim 8, wherein a downstream end of the head has a width of 30% to 300% of the first waveguide, and wherein the downstream end width of the head is less than a width of a downstream end of the body.

10. The method of claim 9, wherein the head has a length of about 1 micrometer to about 50 micrometers.

11. The method of claim 1, wherein the second waveguide is in the form of a Bragg grating.

12. The method of claim 11, wherein the Bragg grating has a grating period of about 50 nanometers to about 600 nanometers.

13. The method of claim 12, wherein a proximal end region of each leg includes a quadrilateral feature.

14. The method of claim 13, wherein an upstream end of the quadrilateral feature has a width of about 10 nanometers to about 300 nanometers.

15. The method of claim 12, wherein the Bragg grating has a spacing of 1% to 99% of a grating period of the Bragg grating.

16. The method of claim 1, wherein the birefringent coupler has an effective refractive index for a TM mode which is greater than a refractive index of the first waveguide, and wherein the birefringent coupler has an effective refractive index for a TE mode which is less than the refractive index of the first waveguide.

17. A photonic polarizing beamsplitter, comprising:
a first waveguide;
a second waveguide located above the first waveguide; and
a birefringent coupler between the first waveguide and the second waveguide;
wherein the second waveguide comprises a plurality of outwardly tapering legs with a gap between adjacent legs that are connected downstream to a body, as determined when light is sent into the first waveguide.

18. The beamsplitter of claim 17, wherein the birefringent coupler comprises hafnium oxide, zirconium oxide, aluminum oxide, hafnium silicate, zirconium silicate, hafnium oxynitride, zirconium oxynitride, silicon oxynitride, boron nitride, or silicon carbide.

19. A method for separating TE-mode wavelengths from TM-mode wavelengths in a photonic device, comprising:
sending an optical input into a first waveguide, the optical input comprising the TE-mode wavelengths and the TM-mode wavelengths;
passing the optical input through a vertical overlap region that includes a birefringent coupler and a second waveguide above the first waveguide, wherein the second waveguide comprises a plurality of outwardly tapering legs with a gap between adjacent legs that are connected downstream to a body;
receiving the TM-mode wavelengths in the second waveguide; and
retaining the TE-mode wavelengths in the first waveguide.

20. The method of claim 19, wherein the body has a length of about 1 micrometer to about 50 micrometers.

* * * * *